(12) United States Patent
Hoshi (10) Patent No.: US 7,780,306 B2
(45) Date of Patent: Aug. 24, 2010

(54) LIGHT GUIDE PLATE, BACKLIGHT UNIT AND METHOD OF MANUFACTURING THE SAME, AND LIQUID CRYSTAL DISPLAY

(75) Inventor: Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 143 days.

(21) Appl. No.: 11/562,790

(22) Filed: Nov. 22, 2006

(65) Prior Publication Data
US 2007/0121340 A1  May 31, 2007

(30) Foreign Application Priority Data
Nov. 25, 2005 (JP) .......................... P2005-340675

(51) Int. Cl.
*G09F 13/04* (2006.01)
(52) U.S. Cl. ..................... 362/97.1; 362/600; 362/612; 362/615; 362/625; 362/627; 362/629; 362/633; 362/621
(58) Field of Classification Search ................... 362/97, 362/600, 612, 615, 625, 627, 629, 633, 621
See application file for complete search history.

(56) References Cited

U.S. PATENT DOCUMENTS

| 6,036,328 | A | * | 3/2000 | Ohtsuki et al. | ............... 362/612 |
| 6,607,286 | B2 | | 8/2003 | West et al. | |
| 6,679,621 | B2 | | 1/2004 | West et al. | |
| 7,341,358 | B2 | * | 3/2008 | Hsieh et al. | .................... 362/97 |
| 7,413,318 | B2 | * | 8/2008 | Hsu et al. | .................. 362/97.1 |
| 2002/0163808 | A1 | | 11/2002 | West et al. | |
| 2003/0235050 | A1 | | 12/2003 | West et al. | |
| 2005/0185391 | A1 | * | 8/2005 | Lee et al. | ........................ 362/29 |
| 2006/0114690 | A1 | * | 6/2006 | Iki et al. | ...................... 362/612 |
| 2007/0086179 | A1 | * | 4/2007 | Chen et al. | .................... 362/27 |

FOREIGN PATENT DOCUMENTS

| JP | 8-136917 | 5/1996 |
| JP | 2001-006416 | 1/2001 |
| JP | 2001-351424 | 12/2001 |
| JP | 2003-008068 | 1/2003 |
| JP | 2004-133391 | 4/2004 |

OTHER PUBLICATIONS

Nikkei Electronics, Nikkei Business Publications, Inc., Dec. 20, 2004, pp. 123-130.
Japanese Office Action issued on Jan. 19, 2010, for corresponding Japanese Patent Application 2005-340675.

* cited by examiner

*Primary Examiner*—Sandra L O'Shea
*Assistant Examiner*—Jessica L McMillan
(74) *Attorney, Agent, or Firm*—K&L Gates LLP

(57) ABSTRACT

A light guide plate is provided. The light guide plate includes a light source hole part configured to accommodate a light source, the light source hole part provided at a back surface on the opposite side of a light emitting surface; and a recessed part provided on the side of said light emitting surface opposed to the light source hole part. The recessed part has, at the bottom portion of the recessed part, a slant surface inclined against the light emitting surface.

6 Claims, 10 Drawing Sheets

LIGHT GUIDE PLATE, BACKLIGHT UNIT AND METHOD OF MANUFACTURING THE SAME, AND LIQUID CRYSTAL DISPLAY

CROSS REFERENCES TO RELATED APPLICATIONS

The present application claims priority to Japanese Patent Application JP 2005-340675 filed in the Japanese Patent Office on Nov. 25, 2005, the entire contents of which being incorporated herein by reference.

BACKGROUND

The present disclosure relates to a light guide plate preferable for application to a backlight unit in, particularly, a transmission type liquid crystal display, to a backlight unit using the light guide plate and a method of manufacturing the same, and to a liquid crystal display using the backlight unit.

In recent years, very thin type displays such as CRTs (Cathode Ray Tubes), LCDs (Liquid Crystal Displays) and PDPs (Plasma Display Panels) have been proposed as displays for television sets and been put to practical use. Particularly, the liquid crystal displays using liquid crystal panels have spread more and more and technical research and development thereof have been progressing because the liquid crystal displays can be driven with low power consumption and the prices of large-type liquid crystal panels have been decreasing.

In the liquid crystal displays, the backlight system has become a main stream, where a transmission type liquid crystal display panel equipped with color filters is illuminated from the back side by a backlight unit capable of plane-mode illumination, whereby a color image is displayed.

As a light source for the backlight unit, a CCFL (Cold Cathode Fluorescent Lamp), which emits white light by use of a fluorescent lamp, and LEDs (Light Emitting Diodes) are deemed as promising (refer to, for example, Japanese Patent Laid-open No. Hei 8-136917).

Particularly, owing to the development of the blue light emitting diode, the set of LEDs for respectively emitting red light, green light and blue light, which are the three primary colors of light, has been completed, and it is possible to obtain white light with high color purity by mixing the red light, green light and blue light emitted from the LEDs. Therefore, the use of a set of the LEDs as a light source for a backlight unit makes it possible to enhance the color purity obtained through the liquid crystal display panel and, therefore, to largely broaden the range of reproducible colors, as compared with that attained by use of a CCFL. Furthermore, the use of high-output LED chips makes it possible to greatly enhance the luminance of the backlight unit.

In the case of using a set of the LEDs as a light source of a backlight unit, if the layout of the LEDs is of the beneath type, i.e., if the LEDs are laid out beneath the light emitting surface, luminance irregularities and/or color irregularities would be generated because the LEDs are point light sources.

In order to solve this problem, the distance between the LEDs and a diffuser plate may be enlarged. This approach, however, results in the backlight having a very large thickness, as compared with a backlight using the CCFL. The liquid crystal displays are desired to be further reduced in weight and thickness, and the backlight therefor is also desired to be further reduced in thickness.

In view of this, as a method for reducing the thickness of backlight, there has been proposed a structure in which a light guide plate is used and the light from a light source disposed at a part of the light guide plate is subjected to multiple reflection so as to form a surface light source.

In addition, as an LED for use as a light source, there has been proposed a structure of using a side emitter type LED in which the lens covering a light emitting device is so shaped that the light emitted just above is refracted into a lateral direction and the light is taken out principally in the lateral direction (refer to, for example, Nikkei Electronics (Nikkei Business Publications, Inc.), Dec. 20, 2004 (No. 889), pp. 123 to 130).

A backlight unit using such side emitter type LEDs is useful because it ensures that mixing of RGB (red, green and blue) lights is easy to carry out and that luminance irregularities and color irregularities can be restrained.

However, even if the LEDs radiating light primarily in a lateral direction as mentioned above are used, the light emitted from the LEDs in the vertically upward direction may not be completely eliminated.

Figure 18:
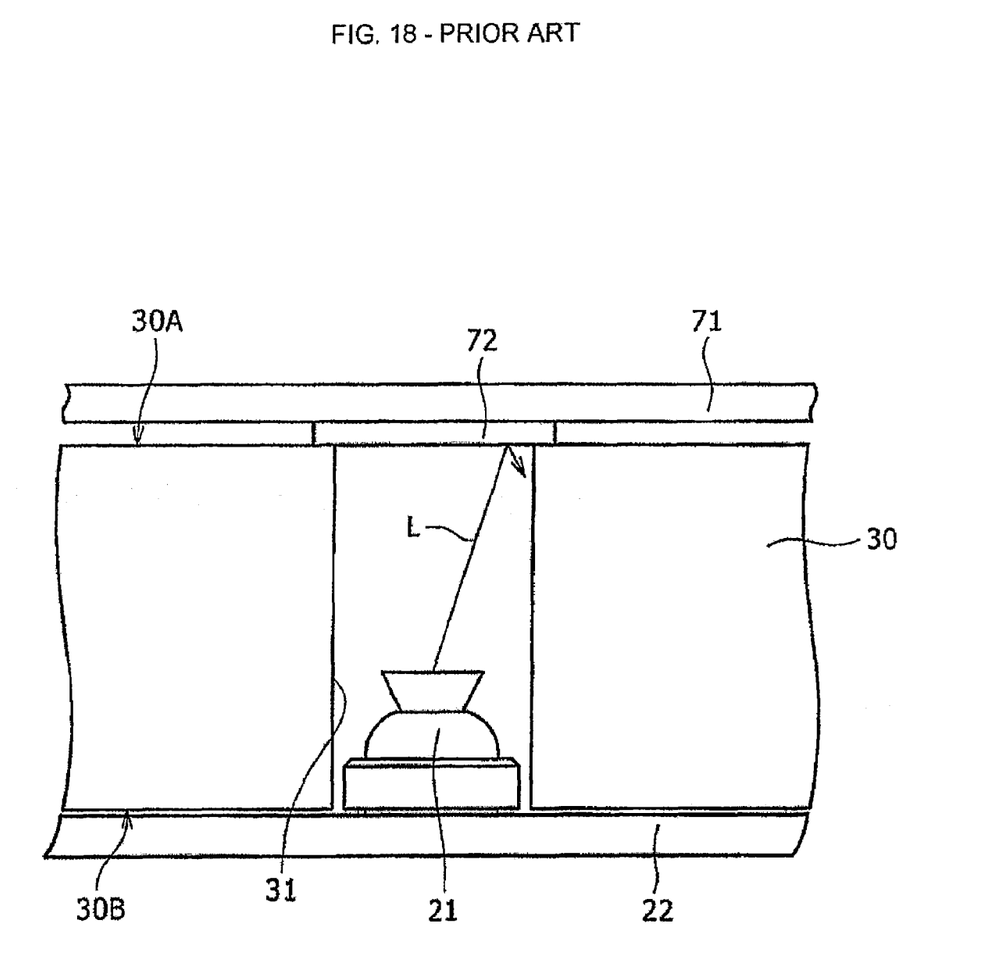
FIG. 18 is a schematic sectional configuration diagram of an example of a backlight unit according to the related art.

Therefore, for example, a general sectional configuration is schematically shown in FIG. 18. A light guide plate 30 is provided with a light source hole part 31 communicating from a light emitting surface 30A thereof to a back surface 30B thereof, and a light source 21 composed, for example, a side emitter type LED or the like is disposed on a reflecting structure part 22 on the back surface 30B side in the light source hole part 31. A light transmitting member 71 formed with a light-shielding part 72 of a white ink or the like by printing or the like is formed, and the light transmitting member 71 is so disposed that the light-shielding part 72 is opposed to an upper portion, or the light outgoing side, of the light source hole part 21 of the light guide plate 30.

In this case, however, it may be necessary for the light-shielding part 72 to be formed at a predetermined position, or the position corresponding to the layout pattern of the light source hole part 21, of the light transmitting member 71. This configuration is disadvantageous for reductions in cost and in the number of component parts.

Besides, in the case of using red, blue and green LEDs as light sources, if the light going out of the LED in the vertically upward direction is shielded by use of such a light-shielding member, the other-colored light coming from the surroundings may mix into the light under consideration, possibly leading to the generation of color irregularities.

Therefore, the simple provision of a light-shielding structure directly above the light source is unsatisfactory for a display. Specifically, it is difficult to completely eliminate the luminescent point, or the so-called hot spot, due to the leakage of light from a roughly central position of the LED, and to eliminate luminance irregularities and color irregularities. At present, it may be necessary to provide a comparatively large spacing between the light sources and the display panel for sufficiently reducing the luminance irregularities and color irregularities, and it is difficult to make a backlight unit and a liquid crystal display smaller in thickness. In addition, depending on the materials of a reflective coat or a light absorber used as the light-shielding part, the amount of light absorbed and the amount of unavailable light may be large, which may result in lowering in light take-out efficiency and in light utilizing efficiency.

In order to solve these problems, it may be said to be desirable to direct more of the light going out of the light source vertically upwards into the light guide plate, rather than to simply shield the upper side of the light source.

Besides, not only in the case of using the side emitter type LEDs as above-mentioned but also in the case of using ordinary LEDs, if the light going upwards from the LED can be guided into the light guide plate, it is possible to reduce the number of component parts, to improve the luminance irregularities and color irregularities, and further to reduce cost.

Thus, there is a need for a light guide plate capable of guiding more of the light emitted from a light source vertically upwards, or toward the light emitting surface side, into the light guide plate and capable of reducing the number of component parts, for a backlight unit using the light guide plate and a method of manufacturing the backlight unit, and for a liquid crystal display using the backlight unit.

SUMMARY

According to one embodiment, there is provided a light guide plate including: a light source hole part configured to accommodate a light source, the light source hole part provided at a back surface on the opposite side of a light emitting surface; and a recessed part provided on the side of the light emitting surface opposed to the light source hole part. The recessed part has, at the bottom portion of the recessed part, a slant surface inclined against the light emitting surface.

According to another embodiment, there is provided a backlight unit having the above mentioned light guide plate according to the one embodiment. Specifically, there is provided a backlight unit including: a light guide plate; a light source hole part configured to accommodate a light source, which is provided, at a back surface of the light guide plate on the opposite side of a light emitting surface; and a recessed part provided on the side of the light emitting surface opposed to the light source hole part. The recessed part has, at the bottom portion of the recessed part, a slant surface inclined against the light emitting surface. The light source is disposed in the light source hole part. A reflecting structure part is provided at least at the back surface of the light guide plate.

According to an embodiment, there is provided a method of manufacturing a backlight unit, including: disposing a light emitting device over a substrate, with a predetermined spacing therebetween; applying a filler composed of a light transmitting material to the light emitting device; and disposing and fixing a light guide plate so that a light source hole part provided at a back surface of the light guide plate covers the light emitting device, with the filler therebetween.

According to an embodiment, in the above mentioned method of manufacturing a backlight unit, the above mentioned light guide plate is used as the light guide plate. Specifically, the light guide plate is provided, at a light emitting surface thereof on the opposite side of a back surface thereof, with a recessed part at the position opposed to a light source hole part, and the recessed part has, at the bottom portion of the recessed part, with a slant surface inclined against the light emitting surface.

According to an embodiment, there is provided a liquid crystal display including a transmission type liquid crystal display panel, and a backlight unit configured to illuminate the liquid crystal display panel from the back side. The backlight unit includes a light guide plate which is provided, at a back surface thereof on the opposite side of a light emitting surface thereof, with a light source hole part for accommodating a light source, and which is provided with a recessed part on the side of the light emitting surface thereof opposed to the light source hole part thereof; the recessed part has, at the bottom portion of the recessed part, a slant surface inclined against the light emitting surface; the light source is disposed in the light source hole part; and a reflecting structure part is provided at least at the back surface of the light guide plate.

As described above, in the light guide plate, the backlight unit and the liquid crystal display, the light guide plate is provided with the recessed part on the light emitting surface side at the position opposed to the light source, and is provided with the slant surface on the light source side. Therefore, the light going out upwards from the light source can be guided into the light guide plate by reflecting the light by the slant surface of the recessed part.

In this case, it is not necessary that a light transmitting member with a light shielding part disposed in correspondence with the light source as mentioned above is provided on the light guide plate, and it is possible to reduce the number of component parts.

In addition, according to the method of manufacturing a backlight unit according to the embodiment, a light emitting device is disposed over a substrate, and a light guide plate is disposed and fixed over the light emitting device so that a light source hole part of the light guide plate covers the light emitting device, with a filler therebetween. Therefore, the need for a cover member such as a lens for covering the light emitting device is eliminated. Thus, the number of component parts can be reduced.

Furthermore, by use of the light guide plate according to the embodiment, more of the light going upwards from the light source can be guided into the light guide plate, and the need for a light transmitting member having a light-shielding part to be provided on the light emitting surface side is eliminated, so that the number of component parts of the backlight unit can be further reduced.

As described above, in the light guide plate, the backlight unit and the method of manufacturing the same, and the liquid crystal display, more of the light going upward from a light source toward the light emitting surface side can be guided into the light guide plate, and the number of component parts can be reduced.

The above and other features of the present disclosure will become apparent from the following description when taken in conjunction with the accompanying drawings.

Additional features and advantages are described herein, and will be apparent from, the following Detailed Description and the figures.

DETAILED DESCRIPTION

Examples of the best mode of carrying out the present invention are described below.

Figure 1:
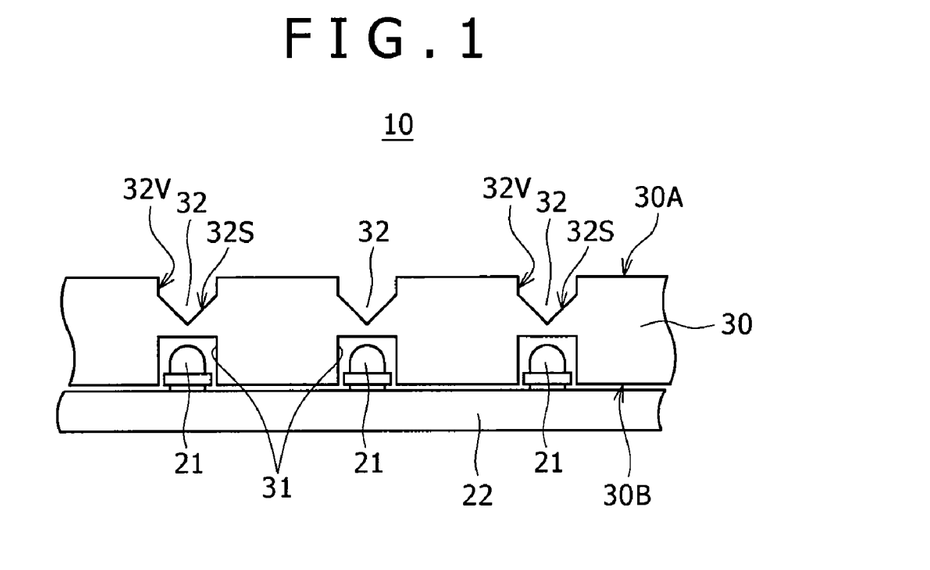
FIGS. 1 to 10 are each a schematic sectional configuration diagram of an main part of an embodiment of the backlight unit.
Figure 2:
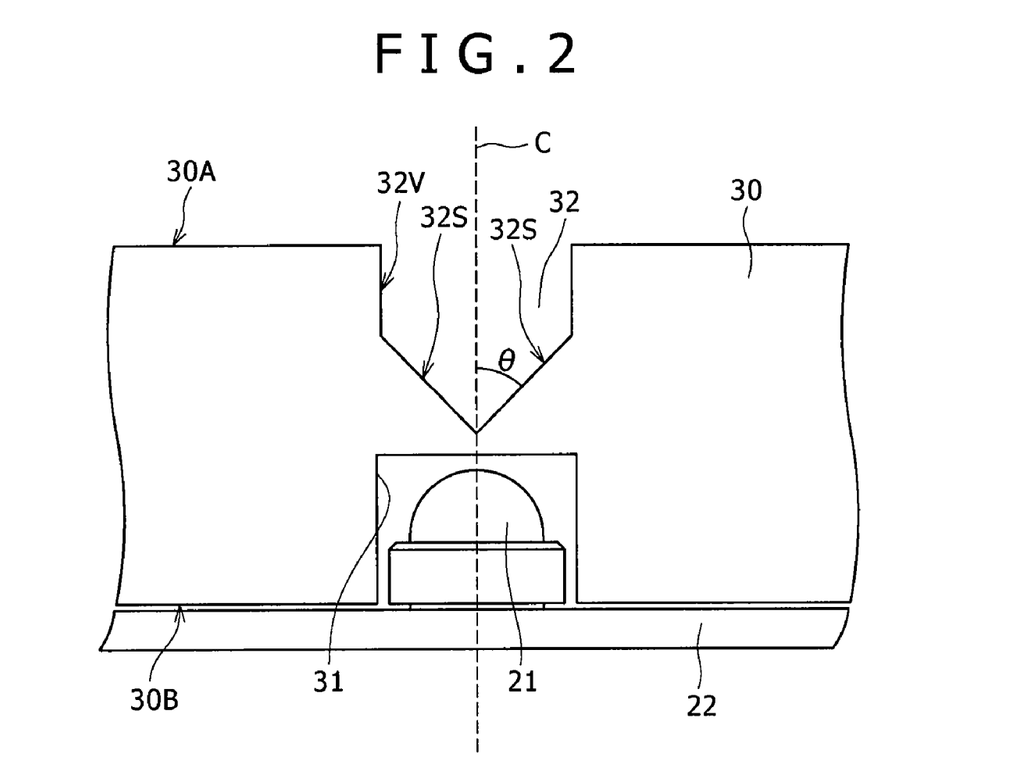

First, a schematic configuration diagram of an embodiment of a light guide plate in a backlight unit is shown in FIGS. 1 and 2.

As illustrated in FIG. 1, in this backlight unit 10, light source hole parts 31 for accommodating light sources 21 are provided on the side of a back surface 30B of a light guide plate 30, and recessed parts 32 are provided on the side of a light emitting surface 30A, opposed to the light source hole parts 31, of the light guide plate 30. The recessed part 32 has, at the bottom portion, a slant surface 32S inclined against the light emitting surface 30A. In the embodiment shown, an opening end portion of the recessed part 32 is a perpendicular surface 32V substantially perpendicular to the light emitting surface 30A, and the bottom portion side of the recessed part 32 is formed as the slant surface(s) 32S of a conical shape, a pyramidal shape or the like.

The backlight unit 10 using the light guide plate 30 has a configuration in which the light source 21, for example, an LED with a Lambert type radiation distribution is disposed in each light source hole part 31, and a reflecting structure part 22 is provided at least on the side of the back surface 30B of the light guide plate 30.

Here, the light source hole parts 31 are provided, for example, in the form of a plurality of lines arranged at regular intervals, and the light sources 21 composed of white LEDs or of R (red), G (green) and B (blue) LEDs are disposed in the light source hole parts 31, for example in this order, to be thereby assembled in the light guide plate 30. While a section where the LEDs 21 are arrayed is shown in FIG. 1, a configuration may be adopted in which similar LED arrays are provided, for example, in the direction perpendicular to the surface of the sheet of FIG. 1. They, as a whole, constitute a planar light source wherein the light sources 21 composed of LEDs are dispersely arranged.

As the material of the light guide plate 30, there can be used a colorless transparent resin, for example an acrylic resin, which has light transmitting property in the wavelength region of the light sources 21 used.

Though not shown, the reflecting structure part composed of a reflective sheet or the like may be arranged not only at the back surface 30B of the light guide plate 30 but also at each of side surfaces of the light guide plate 30.

In addition, over the light emitting surface 30A of the light guide plate 30, there may be provided a light deflecting sheet, or, if necessary, a polarizing and separating sheet having the function of separating the incident light into polarized components orthogonal to each other, or the like.

The light sources 21 are disposed and fixed on a structure part provided with a wiring structure, such as a printed wiring board. In FIG. 1, however, such a wiring structure is omitted. As for the wiring structure, various configurations may be adopted. For example, the wiring structure may be formed on the reflecting structure part 22 by printing or the like. Or, the reflecting structure part 22 may be provided with through-holes penetrating therethrough in the thickness direction thereof. Also, a wiring pattern or the like may be provided on the back surface side, namely on the opposite side of the light guide plate of the reflecting structure part 22. Further, a wiring structure separate from the reflecting structure part 22 may be provided on the back side of the reflecting structure part 22, and they may be connected.

Besides, in the light guide plate in an embodiment, the recessed part 32 provided on the side of the light emitting surface 30A has the function of totally reflecting the light going out of the light source 21 opposed thereto, by the slant surface 30S thereof. Therefore, in the case where the light source 21 is a light source having a radiation angle distribution which is rotationally symmetric around the center axis, such as a Lambert type LED and a side emitter type LED, it is desirable for the slant surface(s) 32S to be a slant surface or surfaces substantially rotation-symmetric about the center axis, as for example an enlarged sectional configuration of a main part thereof is shown in FIG. 2. In FIG. 2, the parts corresponding to those in FIG. 1 are denoted by the same symbols as used above, and description thereof is omitted here.

Specifically, in the light guide plate according to an embodiment, the slant surface 32S of the recessed part 32 provided at the light emitting surface 30A is inclined against the light emitting surface 30A. As for the angle of inclination, the angle θ against the center line of the light source 21 indicated by broken line C in FIG. C is appropriately selected in correspondence with the radiation angle distribution of the light source 21.

Incidentally, the light source 21 used in the backlight unit 10 is not limited to the LED having a Lambert type radiation angle distribution. For example, there can also be used the above-mentioned side emitter type LED with such a lens shape as to have the radiation angles distributed in the lateral directions, as shown in FIG. 3.

Though details are omitted, the side emitter type LED has a configuration in which a light emitting body such as a light emitting device is held by a resin holder, and an optical part for radiating from its side surface the light generated from the light source is provided, so as to obtain such a directivity that the main component of the outgoing light is in the direction of the outer periphery of the light emitting body. Incidentally, the side emitter type LED is disclosed, for example, in Japanese Patent Laid-open Nos. 2003-8068 and 2004-133391.

Figure 3:
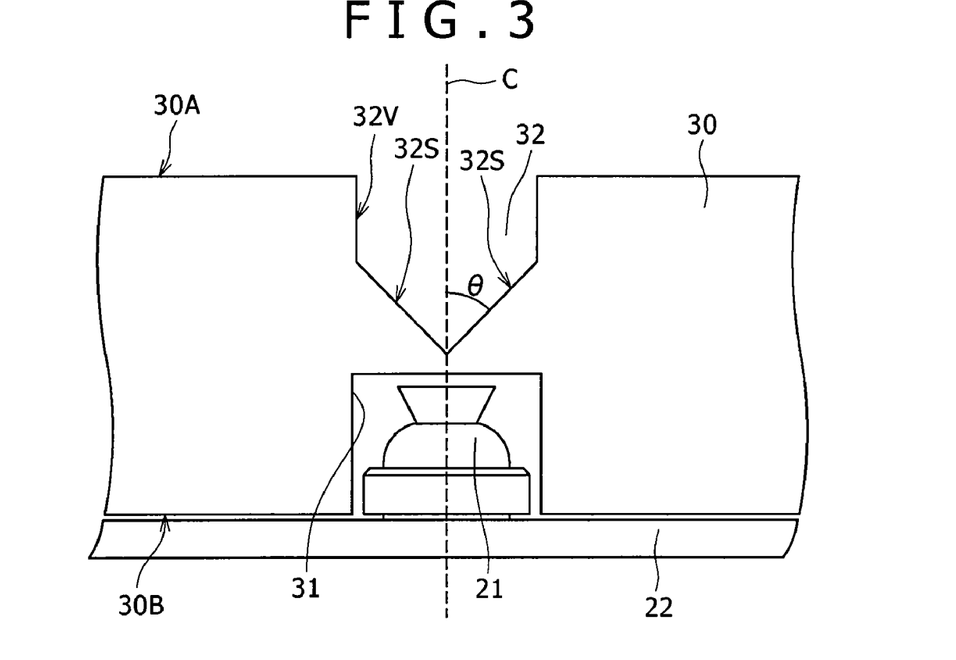

In FIG. 3, the parts corresponding to those in FIG. 2 are denoted by the same symbols as used above, and description thereof is omitted here.

Figure 4:
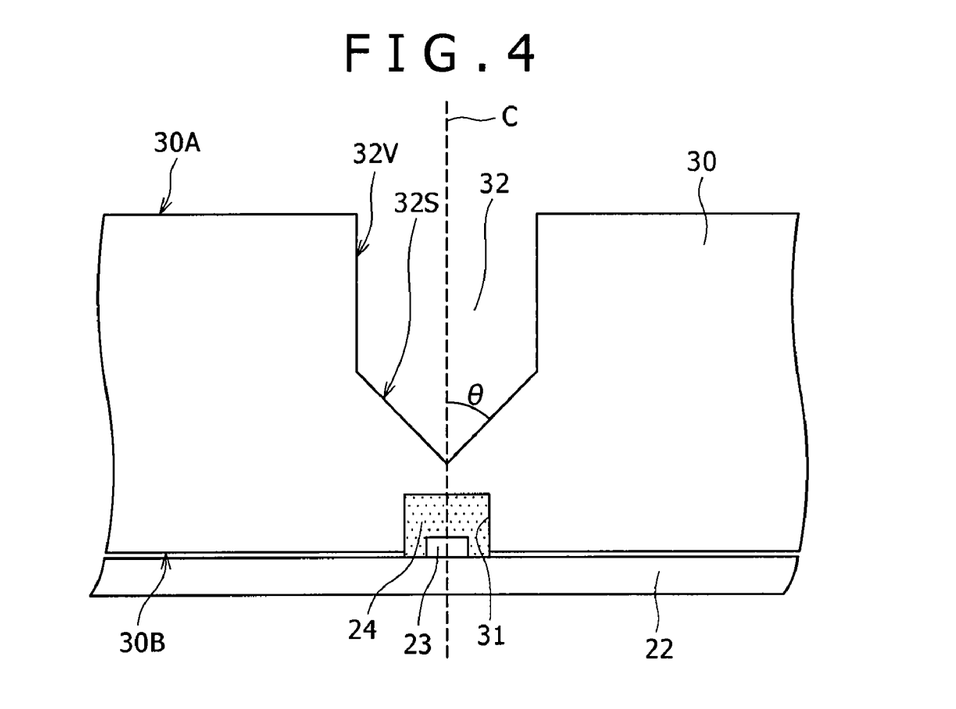

In addition, as shown in FIG. 4, a light emitting device 23, for example, an LED device, or so-called bare chip, may be used as the light source. In this case, an example is shown in which the interior of the light source hole part 31 in the light guide plate 30 is filled up with a filler 24 composed of a light transmitting material, or so-called resin, so as to cover the light source 21 composed of the light emitting device. By enhancing the refractive index of the filler 24 as much as possible, it is possible to enhance the light take-out (pick-up) efficiency, in the same manner as in the case of an ordinary LED. In FIG. 4, the parts corresponding to those in FIG. 2 are denoted by the same symbols as used above, and description thereof is omitted here.

Figure 5:
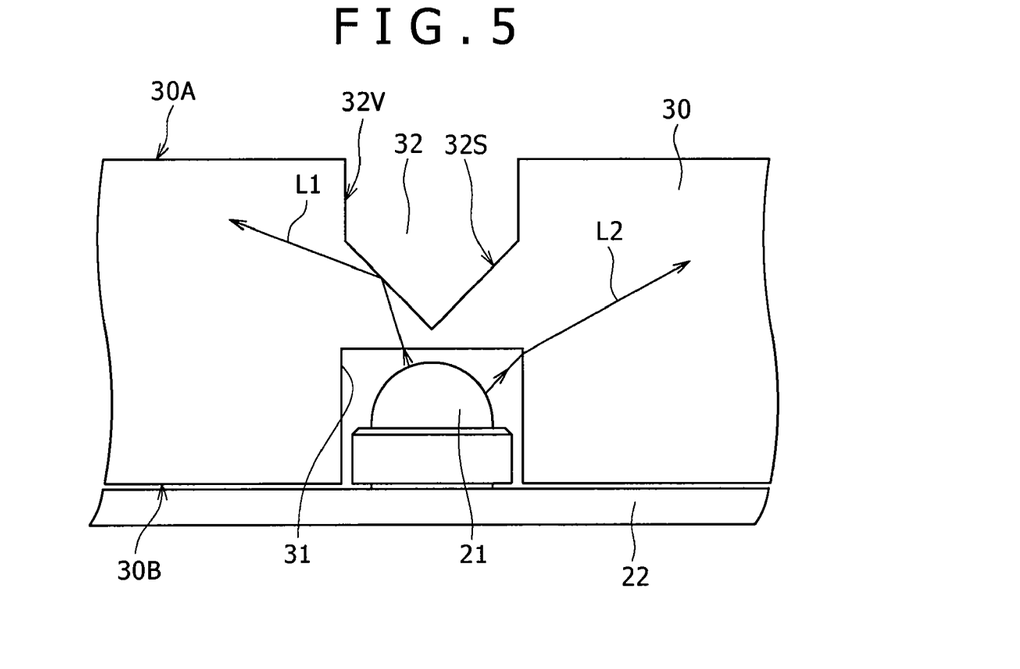
Figure 6:
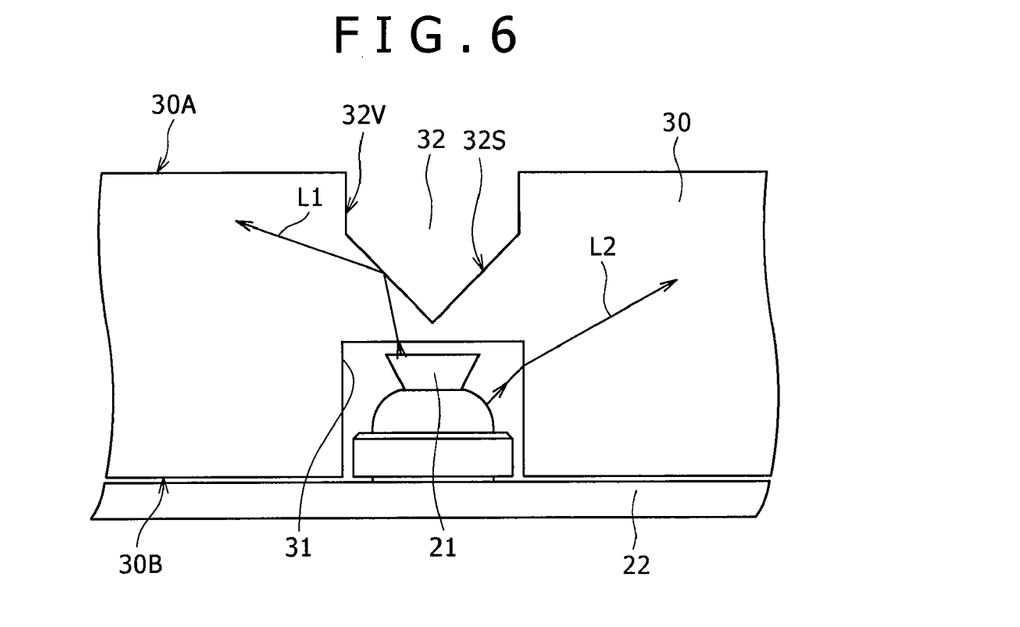
Figure 7:
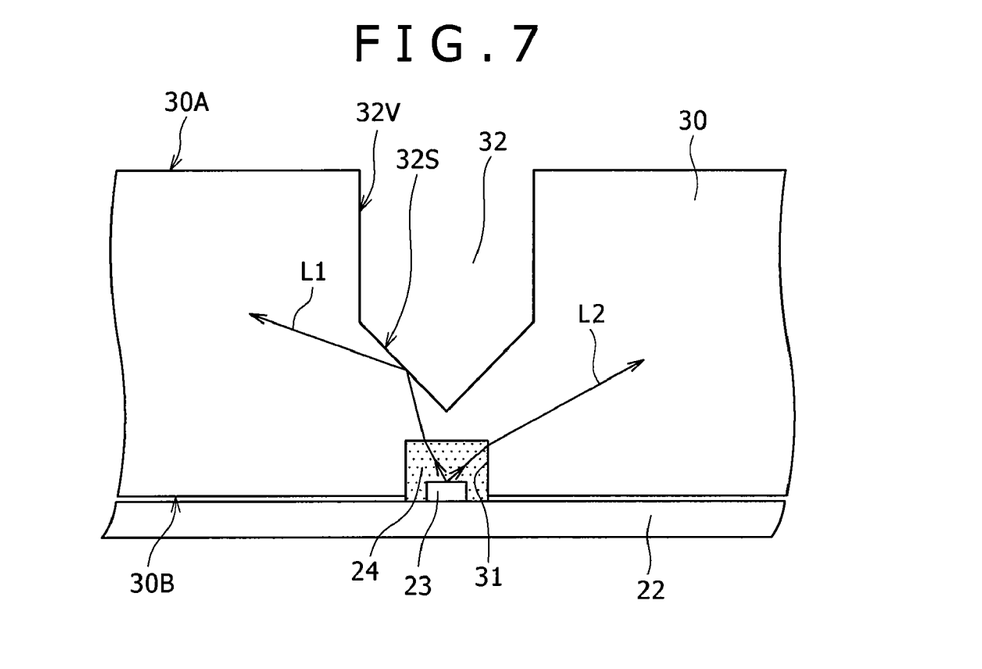

FIGS. 5 to 7 illustrate examples of the loci of light emitted from the light sources 21 in the embodiments shown in FIGS. 2 to 4. As shown in FIGS. 5 to 7, a beam of light emitted from the light source 21 upward, or toward the side of the light emitting surface 30A, travels through the top surface of the light source hole part 31 into the light guide plate 30, as indicated by arrow L1. Then, the light beam is totally reflected by the slant surface 32S of the recessed part 32 into the light guide plate 30, and is basically guided inside the light guide plate 30 while repeating total reflection at the interface between the light guide plate 30 and air present on the upper and lower sides of the light guide plate 30. The beam of light indicated by arrow L2, which travels through a side surface of the light source hole part 31 into the light guide plate 30, is directly guided inside the light guide plate 30 similarly to the above-mentioned. The same applies also to the case where the light source 21 is a side emitter type LED, and to the case where the light source 21 is a light emitting device 23 such as a semiconductor bare chip. In FIGS. 5 to 7, the parts corresponding to those in FIGS. 2 to 4 are denoted by the same symbols as used above, and description thereof is omitted here.

In the next place, the conditions of an optimum shape for assured total reflection, by the slant surface 32S of the recessed part 32, of the light beam going out of the light source 21 upwards (toward the light emitting surface side) were investigated, and the results of the investigation will be described while referring to FIGS. 8 and 9.

Figure 8:
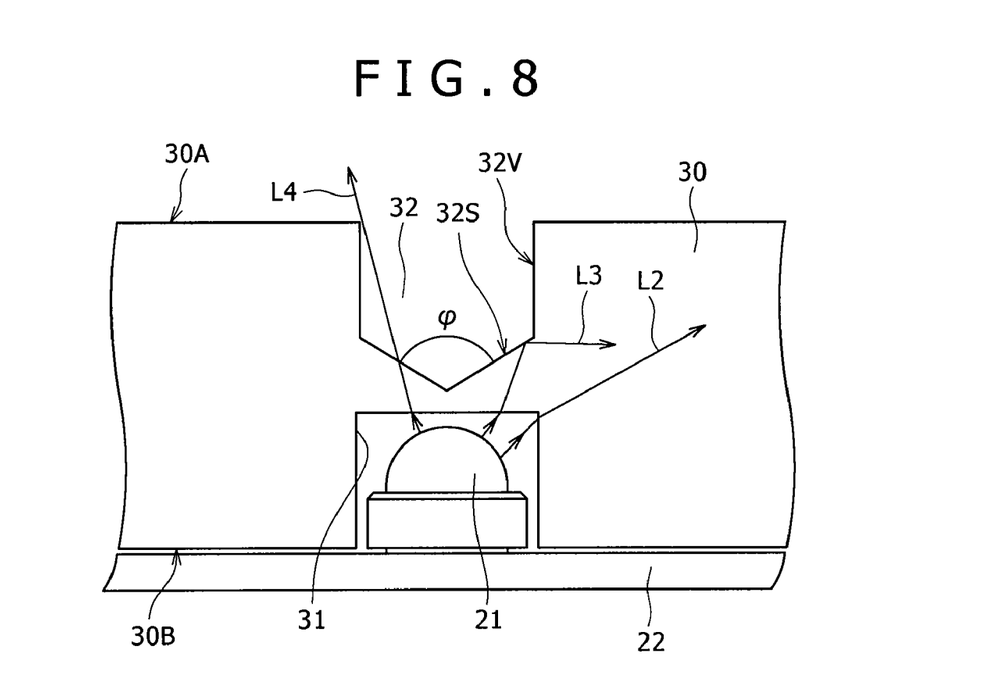
Figure 9:
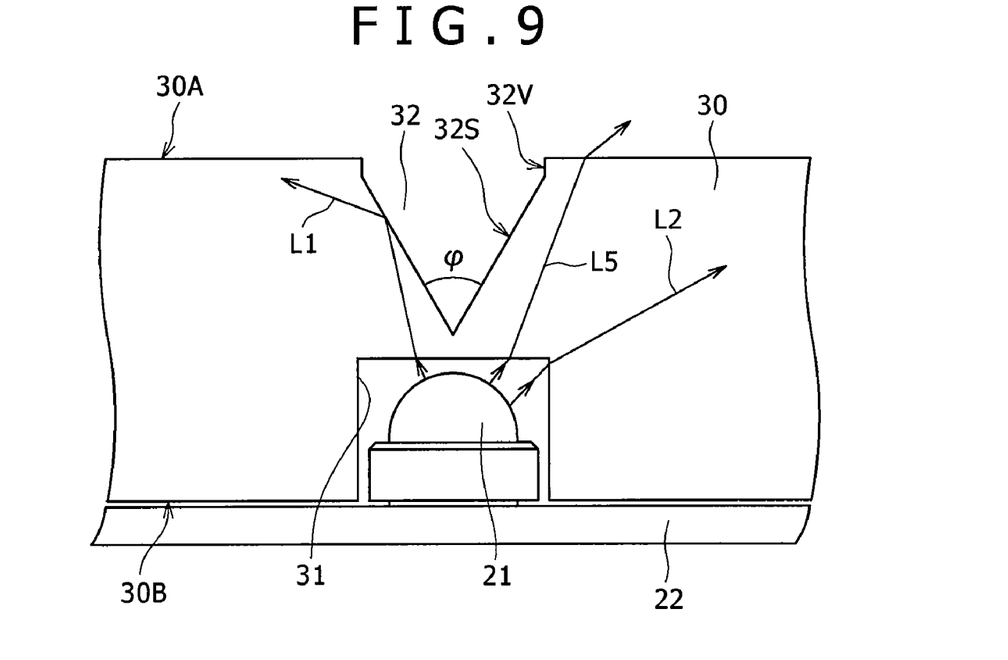

In FIGS. 8 and 9, schematic sectional configurations of embodiments where the angle of the slant surface 32S of the recessed part 32 was changed are shown, and, as the angle of the slant surface 32S of the recessed part 32, the opening angle φ of the slant surface 32S formed in these sections is shown. Incidentally, the slant surfaces 328 desirably have inclination angles symmetrical with respect to the above-mentioned center line of the light source 21 indicated by broken line C in FIGS. 2 to 4.

FIG. 8 shows the case where the slant surface 32S of the recessed part 32 is inclined at a comparatively large opening angle φ, while FIG. 9 shows the case where the slant surface 32S is inclined at a comparatively small opening angle φ; in each of the figures, some examples of the locus of the light beam going out of the light source 21 are shown. In FIGS. 8 and 9, the parts corresponding to those in FIG. 5 are denoted by the same symbols as used above, and description thereof is omitted here.

As shown in FIG. 8, in the case where the opening angle φ of the slant surface 32S is comparatively large so as to say that the slant surface 32S has a gentle angle of inclination against the light emitting surface 30, there may be present not only the light beams going through the top surface of the light source hole part 31 and being reflected by the slant surface 32S to be guided into the light guide plate 30, as indicated by arrow L3, but also the leakage light going through the top surface of the light source hole part 31 and being emitted to the exterior without being totally reflected by the interface at the slant surface 32S, as indicated by arrow L4; therefore, it may be necessary to avoid this leakage of light. For this purpose, it may be necessary to determine the opening angle φ so that the total reflection condition is satisfied at the interface of the slant surface 32S of the recessed part 32.

Of the components of light going out of the light source 21, the most difficult to totally reflect is the beam of light going up vertically from the light source 21, and the condition for total reflection of this light beam is represented by the following formula:

$$\phi \leq n - 2\sin^{-1}(n_{air}/n) \quad (1)$$

where $n_{air}$ is the refractive index of air, and n is the refractive index of the light guide plate. For example, in the case where the light guide plate 30 is formed of PMMA (polymethyl methacrylate; refractive index n=1.49), Φ≦96°.

On the other hand, as shown in FIG. 9, in the case where the opening angle φ is comparatively small and the slant surface 32S has an angle of inclination near a rectangle against the light emitting surface 30A, the beam of light going out of the light source 21 slightly skewly toward the top surface of the light source hole part 31 is a problem, since this beam of light may leak out to the exterior without being totally reflected by the light emitting surface of the light guide plate 30. For obviating such a leakage of light, it is preferable for the opening angle φ to be as large as possible. Taking this into account together with the condition expressed by the above formula (1), the optimum value of the opening angle φ is given by the following formula.

$$\phi = n - 2\sin^{-1}(n_{air}/n) \quad (2)$$

However, the foregoing applies to the case where the light source 21 such as an LED is deemed as an ideal point source of light, and, in the case of a practical LED, the light emitting device, or semiconductor chip, has a finite size. Therefore, designing should be conducted taking other parameters also into account.

Figure 10:
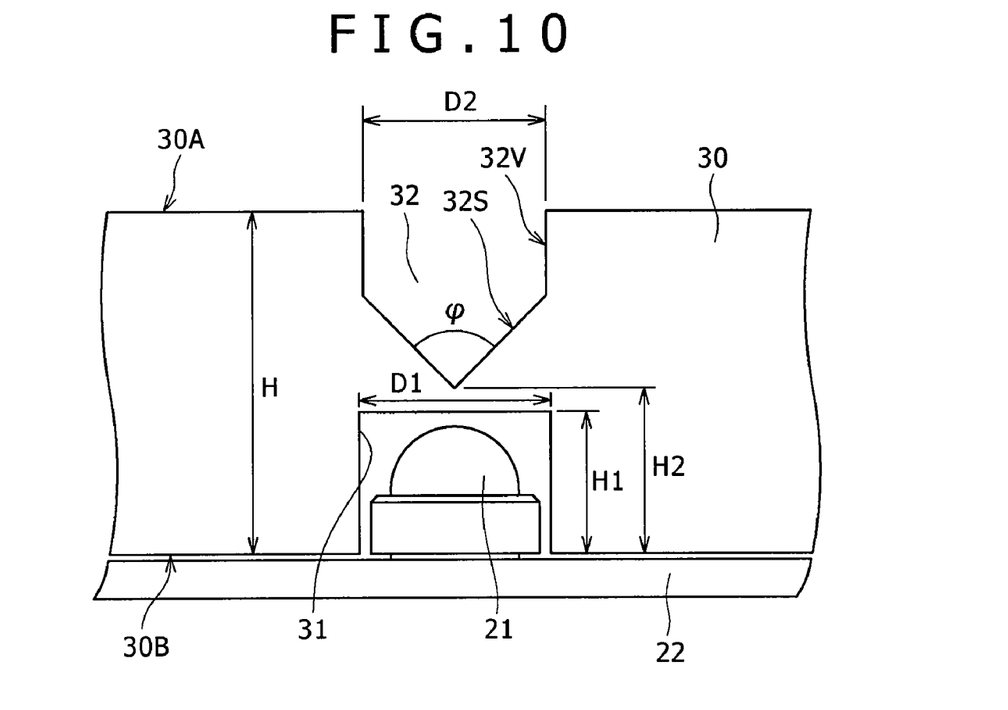

FIG. 10 shows the parameters necessary in investigating the optimum shape of the recessed part on the light emitting surface side in the light guide plate in the present invention. In addition to the opening angle φ of the slant surface 32S obtained by the above formula (2), the parameters include the overall thickness H of the light guide plate 30, the width (diameter, in the case of a cylindrical shape) D1 of the light source hole part 31 in the section shown in FIG. 10, the height H1 of the light source hole part 31, the height H2 of the deepest portion of the recessed part 32 from the back surface 30B of the light guide plate 30, and the width (diameter, in the case of a cylindrical shape) D2 of the recessed part 32 in the section shown in FIG. 10.

Optimum values of these parameters are determined, to a certain extent, depending on the size of the light source 21 such as an LED. The most important parameter is the opening angle φ of the slant surface 32S of the recessed part 32, and the optimum value of the opening angle φ should be adjusted on the assumption that the light source 21 is a point light source, as above-mentioned, and also taking into account the other parameters.

Figure 11A:
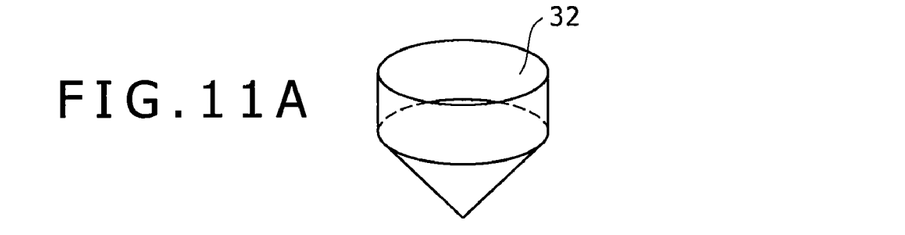
FIGS. 11A to 11C are each a perspective diagram of an main part of an embodiment of the light guide plate.
Figure 11B:
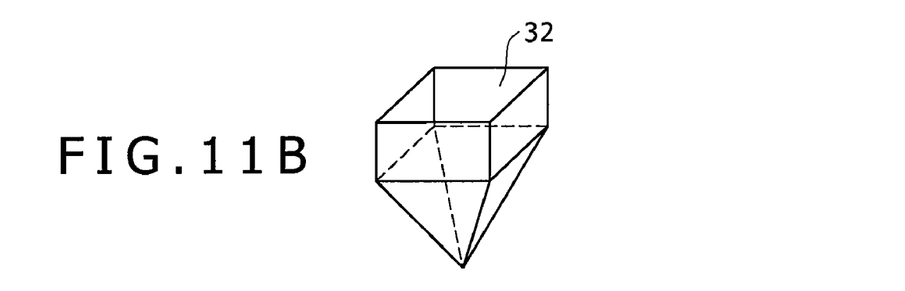
Figure 11C:
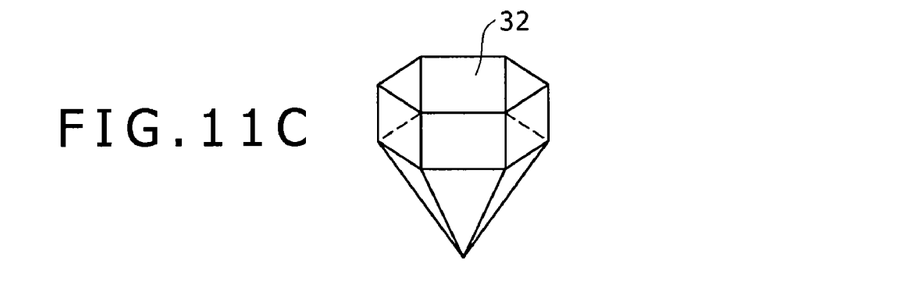

The three-dimensional shape of the recessed part 32, of which the inclination angle of the slant surface 32S is selected in the just-mentioned manner, is desirably a shape which is substantially rotation-symmetrical with respect to the center line of the angular luminance distribution of the light source, as above-mentioned. However, the shape may not necessarily be perfectly rotation-symmetrical, and it suffices for the shape to have a certain degree of symmetry. Specifically, as perspective diagrams of the recessed part 32 are shown in FIGS. 11A to 11C, the slant surface(s) 32S may not necessarily have a conical shape but may have a pyramidal shape which is polygonal in section, such as a tetragonal pyramidal shape and a hexagonal pyramidal shape. Incidentally, a tip end portion constituting the deepest portion of the recessed part 32 where the slant surfaces 32S abut on each other is desirably in a sharp shape projecting toward the light source 21, in any section in the thickness direction of the light guide plate 30.

Figure 12A:
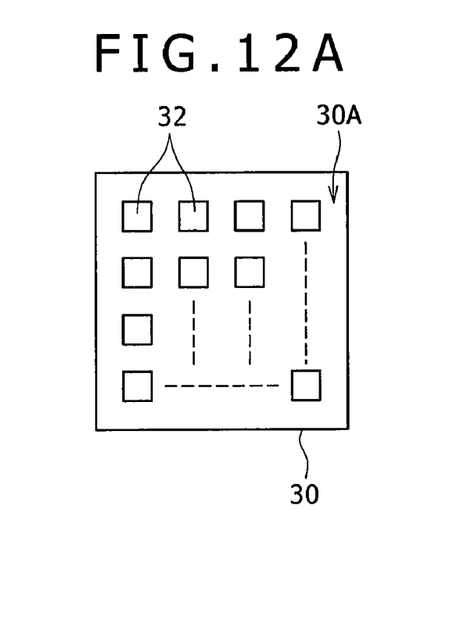
FIGS. 12A and 12B are each a schematic plan configuration diagram of an embodiment of the light guide plate.
Figure 12B:
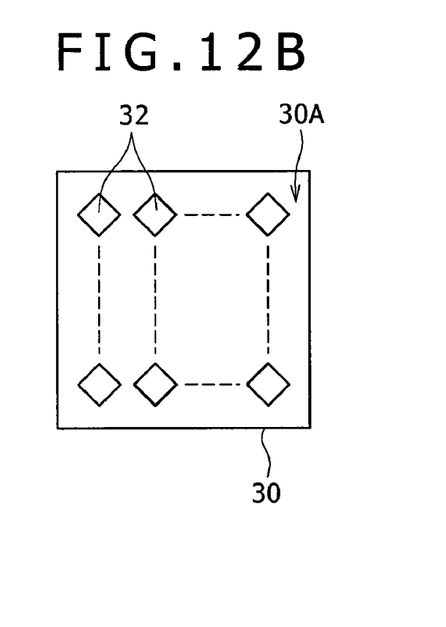

In addition, as for the plan-view layout of the recessed parts 32 (namely, the plan-view layout of the light sources 21), the recessed parts 32 may be arranged at substantially regular intervals, as shown in FIG. 12A. Besides, though not shown, the interval in a row-direction array and the interval in a column-direction array, of the plan-view layout of the recessed parts 32, may be different. Further, in the case where the slant surfaces 32S of the recessed part 32 are in a tetragonal pyramidal shape, the base sides of the tetragonal pyramid may be disposed in skew directions, as shown in FIG. 12B.

Figure 13:
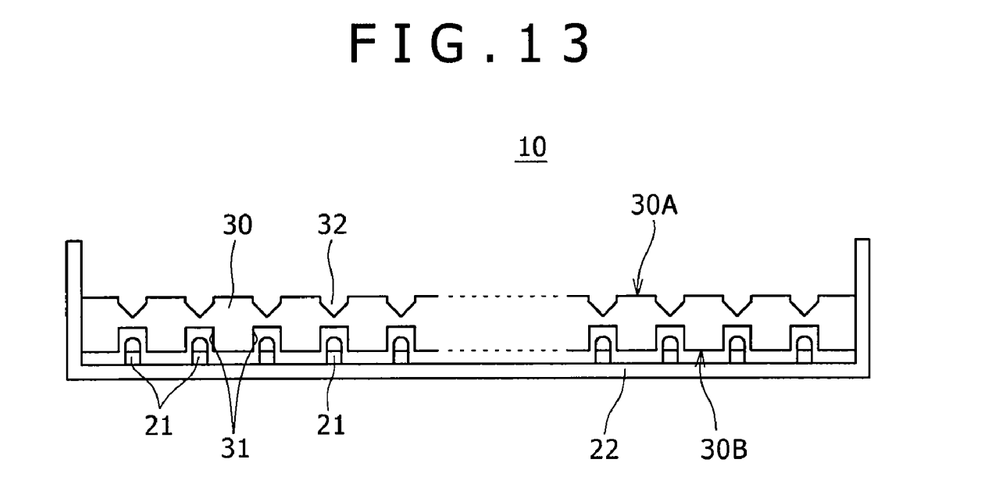
FIG. 13 is a schematic sectional configuration diagram of an embodiment of the backlight unit.
Figure 14:
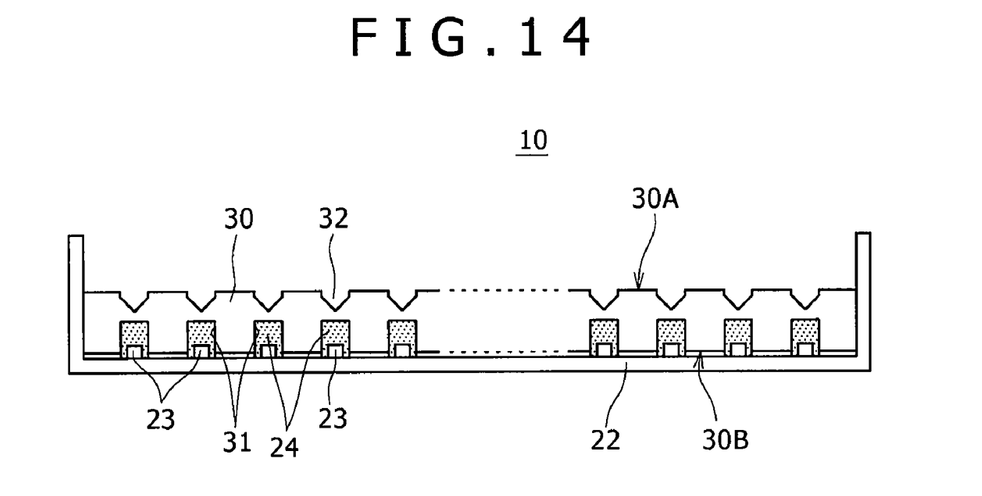
FIG. 14 is a schematic sectional configuration diagram of an embodiment of the backlight unit.

Schematic sectional configuration diagrams of the above-described embodiments of the backlight unit are shown in FIGS. 13 and 14. FIG. 13 shows the case where Lambert type LEDs are used as the light sources 21, whereas FIG. 14 shows the case where light emitting devices 23 are used as the light sources. In FIGS. 13 and 14, the parts corresponding to those in FIGS. 2 and 4 are denoted by the same symbols as used above, and description thereof is omitted here.

Thus, the recessed part 32 including the slant surface(s) 32S with an appropriate inclination angle on the light source side is disposed on the upper side, or the light outgoing side, of the light source 21 (light emitting device 23), whereby more of the light beams going out of the light source 21 upwards can be totally reflected by the interface(s) at the slant surface(s) 32S and can thereby be guided into the light guide plate 30. Besides, in this case, a member having a light shielding part formed by printing or the like may not necessarily be provided on the upper side of the light emitting surface 30A, so that the number of component parts can be reduced.

Particularly, in the embodiment shown in FIG. 14, an optical member formed of a resin or the like for covering the light emitting device of an LED may not be needed, so that the number of component parts is further reduced.

Figure 15A:
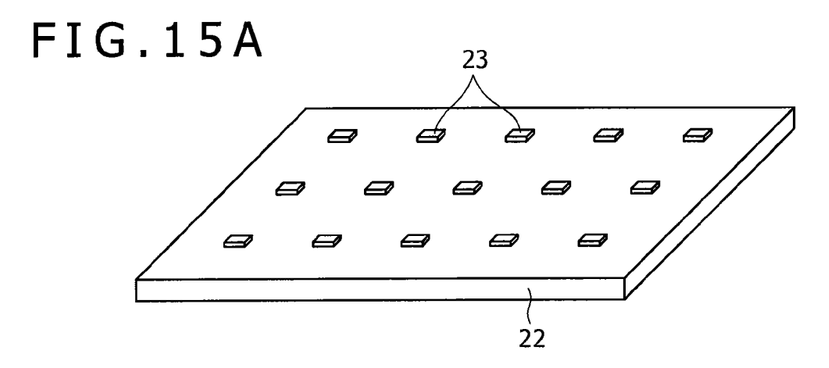
FIGS. 15A to 15C are each a manufacturing step diagram of an embodiment of the method of manufacturing a backlight unit.
Figure 15B:
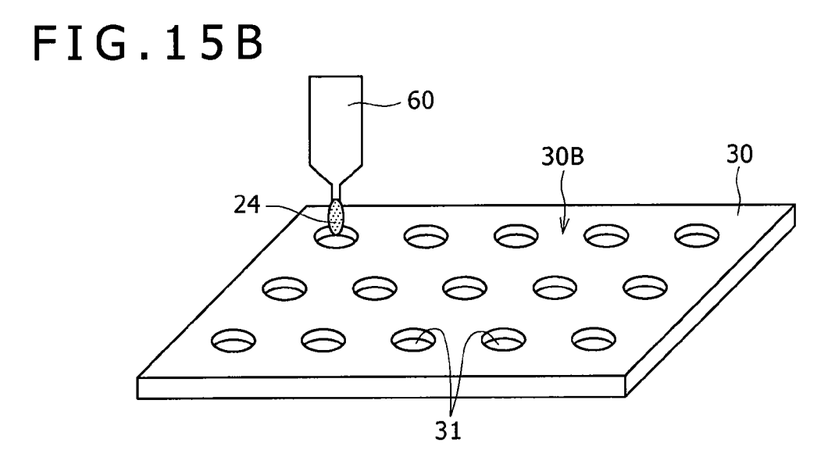
Figure 15C:
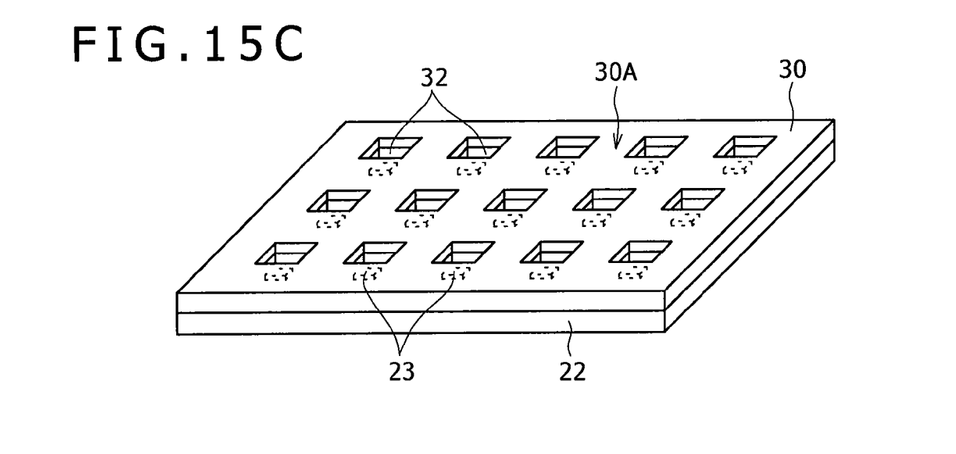

FIGS. 15A to 15C are manufacturing step diagrams illustrating an embodiment of the method of manufacturing the backlight unit which has been described above with reference to FIG. 14.

First, as shown in FIG. 15A, light emitting devices 23 such as LED bare chips are arranged at predetermined positions on a reflecting structure part 22. As for a wiring structure for the light emitting devices 23, various wiring structures may be adopted, for example, a structure in which the reflecting structure part 22 is formed with wiring patterns, or a structure in which the light emitting devices 23 are connected to a separately provided wiring board by way of through-holes formed in the reflecting structure part 22.

Next, as shown in FIG. 15B, a filler 24 (so-called resin) is poured by a dispenser 60 or the like into light source hole parts 31 provided at the back surface 30B of the light guide plate 30. The filler 24 is desirably a material which is light-transmitting and has a refractive index as high as possible. In addition, the shape of the light source hole parts 31 for accommodating the light emitting devices 23 may be a cylindrical shape, a polygonal columnar shape, or such a shape as to realize an angular luminance distribution similar to a lens holder of a side emitter type LED as above-mentioned, or the like.

Thereafter, the light guide plate 30 is arranged on the upper side of and oppositely to the reflecting structure part 22, with the light emitting devices 23 and the light source hole parts 31 aligned with each other, and they are fixed in situ. Alignment is desired such that the tip end portions of the slant surfaces 32S of the recessed parts 32 are disposed on the center lines of the angular luminance distributions of the light sources 21.

Besides, in this case, an air layer may be provided on the light outgoing side of the filler 24.

The backlight unit is manufactured in this manner, whereby it is possible to provide a backlight unit in which the number of component parts is further reduced.

An example of a transmission type liquid crystal display preferable for application of the backlight unit in the present invention is described below, referring to a schematic configuration diagram shown in FIG. 16.

Figure 16:
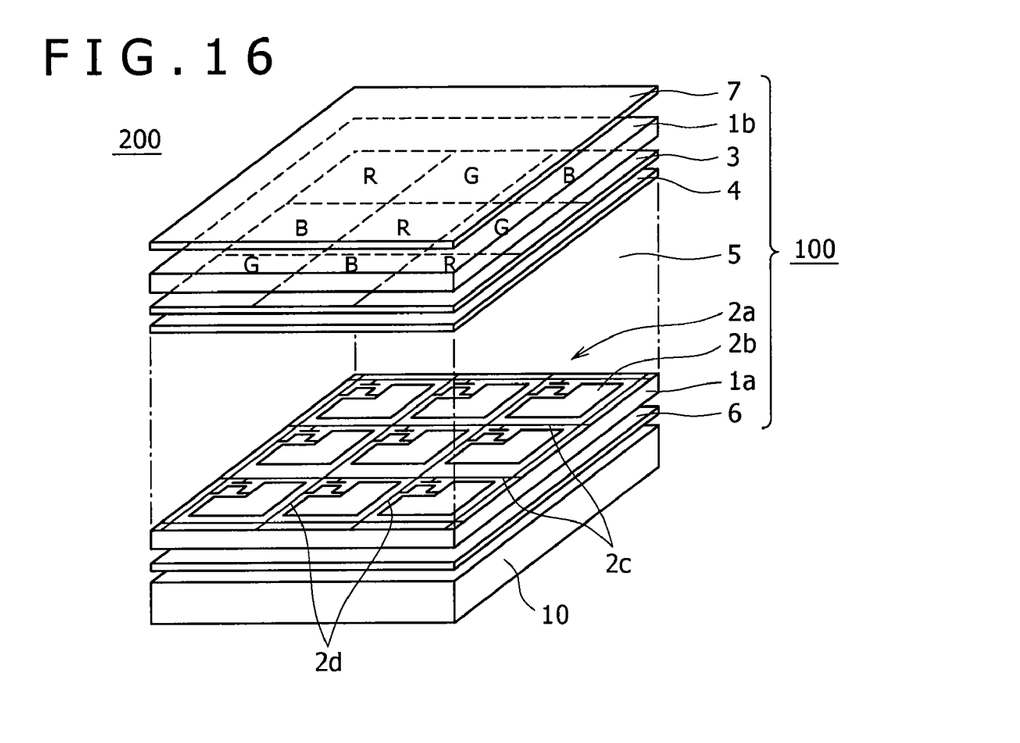
FIG. 16 is a schematic exploded perspective configuration diagram of an example of a liquid crystal display.

As shown in FIG. 16, the transmission type liquid crystal display 200 is composed of a transmission type liquid crystal display panel 100 and a backlight unit 10 provided on the back side thereof. Though not shown, the liquid crystal display 200 may include a reception unit such as an analog tuner, a digital tuner, etc. for receiving ground waves or satellite waves, a video signal processing unit and an audio signal processing unit for respectively processing video signals and audio signals received by the reception unit, an audio signal output unit such as speakers for outputting audio signals processed by the audio signal processing unit, and so on.

This example shows the case of a liquid crystal display of the active matrix driving system. On a first substrate 1a formed of a glass or the like, there are formed TFTs (Thin Film Transistors) 2a for selecting pixels and pixel electrodes 2b connected to drain regions of the TFTs 2a, on a pixel basis. At boundary portions between the pixels, gate bus lines 2c connected to gate electrodes of the TFTs 2a and source bus lines 2d connected to source regions of the TFTs 2a are formed in a lattice pattern so as to connect the pixels.

On the other hand, on a second substrate 1b formed of a glass or the like, color filters 3 for three colors of red (R), green (G) and blue (B) are formed alternately on a pixel basis, and common electrodes 4 each formed for a plurality of pixels are provided on the upper side of the color filters 3. While only the color filters for 3×3=9 pixels are shown in FIG. 16, the color filters 3 in practice are provided for displaying images on m×n pixels. The first substrate 1a and the second substrate 1b are disposed in parallel to each other, with a predetermined spacing therebetween, so that the pixel electrodes 2b and the common electrodes 4 face each other. A liquid crystal 5 is sealed in the space between the pixel electrode 2b and the common electrode 4 in the state of being sandwiched between liquid crystal orientation films (not shown).

Further, a polarizing plate 6 and a backlight unit 10 capable of emitting white light are disposed on the back side of a surface, where the pixel electrodes 2b are formed, of the first substrate 1a. A polarizing plate 7 is disposed on the back side of a surface, where the common electrodes 4 are formed, of the second substrate 1b.

Figure 17:
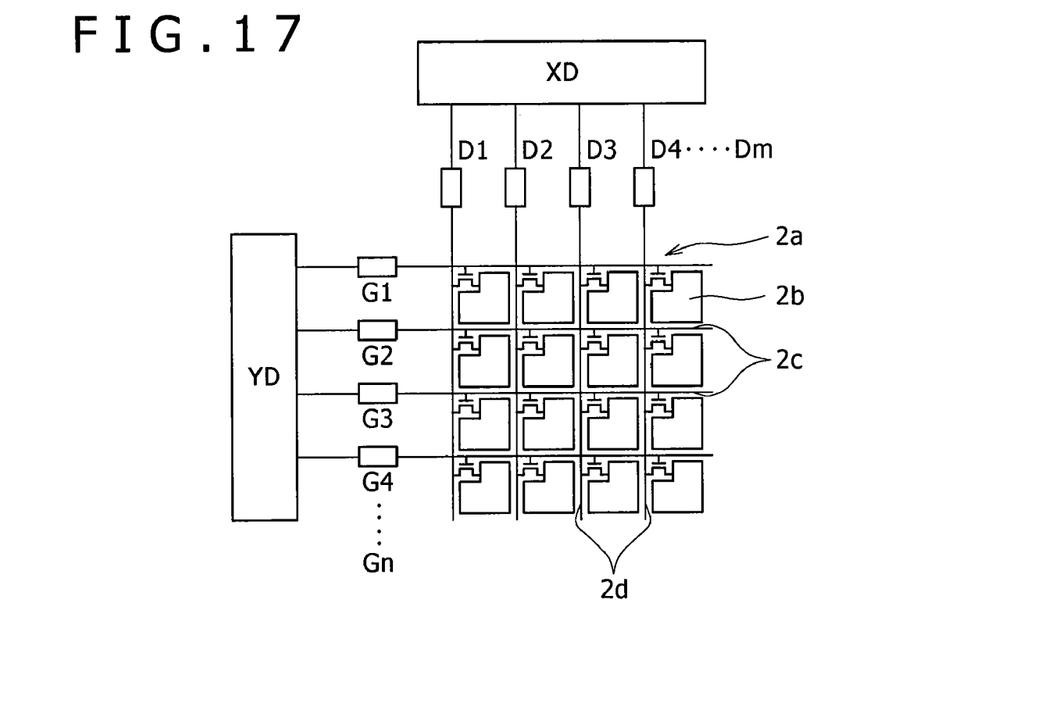
FIG. 17 is a schematic configuration diagram of an main part of an example of the liquid crystal display.

FIG. 17 is a layout diagram of the liquid crystal driving electrodes and the TFTs. While the electrodes and TFTs for 4×4=16 pixels is shown in the figure, they in practice are provided for displaying images on m×n pixels. Thus, on one-side surface of the fist substrate 1a, the TFTs 2a and the pixel electrodes 2b are arranged on a pixel basis, and the gate bus lines 2c and the source bus lines 2d are formed in a lattice form at the boundary portions between the pixels. Liquid crystal drivers including an X driver XD and a Y driver YD are arranged at outer frame portions of the liquid crystal screen or the like, the gate bus lines 2c are connected to the Y driver YD through selection circuits G1 to Gn, and the source bus lines 2d are connected to the X driver XD through selection circuits D1 to Dm.

Here, the TFTs 2a being active devices have the role of realizing connection or disconnection between the pixel electrodes 2b for applying an electric field to the liquid crystal 5 and the source bus lines 2d serving as data electrodes, according to signals from the gate bus lines 2c serving as scan electrode bus, whereby the liquid crystals in the pixels can be selectively driven. The light emitted from the backlight unit 10 and transmitted through the polarizing plate 6 is transmitted through the liquid crystals 5 while being controlled in transmittance by liquid crystal parts selectively driven by the above-mentioned selection circuits, and is transmitted through the color filters 3 and the polarizing plate 7, to form a color image on the polarizing plate 7 side. This results in a high image quality liquid crystal display capable of high-speed operations with a high contrast.

Incidentally, while an example of a liquid crystal display of the active matrix driving system has been described in the above example, the backlight unit and the liquid crystal display can naturally be applied to liquid crystal displays based on various driving systems, such as a simple matrix driving system, and various other suitable configurations.

As has been described above, according to the light guide plate, the backlight unit and the liquid crystal display in the present invention, the light from the light sources can be favorably guided into the light guide plate, so that the need for members provided on the upper side of the light sources for the purpose of partial light shielding is eliminated, and the number of component parts can be reduced.

In addition, according to the method of manufacturing a backlight unit, also, the number of component parts can be reduced by a configuration in which light emitting devices are directly assembled in the unit.

Incidentally, the present invention is not limited to the above embodiments and examples. Naturally, various changes and modifications as to the kind(s) of the light sources, the materials and layout of the light guide plate and the reflecting structure part, etc. are possible within the scope of the gist of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A light guide plate comprising:
a plurality of light source hole parts configured to each accommodate a light source, each of said light source hole parts provided at a back surface on an opposite side of a light emitting surface; and
a plurality of recessed parts, a different one of said recessed parts being provided for each of the light sources and provided on the opposite side of said light emitting surface, each of said recessed parts having, at a bottom portion of said recessed part, a slant surface inclined against said light emitting surface, and at a top portion of said recessed part, a second surface inclined vertically against said light emitting surface.

2. A backlight unit comprising:
a light guide plate;
a plurality of light source hole parts configured to each accommodate a light source, each said light source hole part provided at a back surface of said light guide plate on an opposite side of a light emitting surface; and
a plurality of recessed parts, a different one of said recessed parts being provided for each of the light sources and provided on the opposite side of said light emitting surface, each of said recessed parts having, at the bottom portion of said recessed part, a slant surface inclined against said light emitting surface, and at a top portion of said recessed part, a second surface inclined vertically against said light emitting surface,
said light source disposed in said light source hole part; and
wherein a reflecting structure part is provided at least at said back surface of said light guide plate.

3. The backlight unit according to claim 2, wherein said light source is a light emitting device; and
said light source hole part of said light guide plate is filled with a filler composed of a light transmitting material so as to cover said light emitting device.

4. A method of manufacturing a backlight unit comprising:
disposing a plurality of light emitting devices over a substrate, with a predetermined spacing therebetween;
applying a filler composed of a light transmitting material to each of said light emitting devices; and
disposing and fixing a light guide plate so that light source hole parts provided at a back surface of said light guide plate cover each of said light emitting devices, with said filler therebetween, wherein
a light emitting surface, on the opposite side of said back surface, of said light guide plate is provided with a plurality of recessed parts at positions opposed to each of said light source hole parts, and wherein
each of said recessed parts has, at the bottom portion of said recessed part, a slant surface inclined against said light emitting surface, and at a top portion of said recessed part, a second surface inclined vertically against said light emitting surface.

5. A liquid crystal display comprising:
a transmission type liquid crystal display panel, and
a backlight unit configured to illuminate said liquid crystal display panel from a back side,
wherein, said backlight unit includes a light guide plate which is provided, at a back surface thereof on an opposite side of a light emitting surface thereof, with a plurality of light source hole parts each configured to accommodate a single light source, and
a plurality of recessed parts provided on the side of said light emitting surface thereof, each recessed part opposed to the respective light source hole part thereof;
wherein, each of said recessed parts have, at the bottom portion of said recessed part, a slant surface inclined against said light emitting surface, and at a top portion of said recessed part, a second surface inclined vertically against said light emitting surface;
each of said light sources disposed in the respective light source hole part; and
a reflecting structure part is provided at least at said back surface of said light guide plate.

6. The liquid crystal display according to claim 5, wherein said light source is a light emitting device; and
said light source hole part of said light guide plate is filled with a filler composed of a light transmitting material so as to cover said light emitting device.

* * * * *